Patented Aug. 14, 1923.

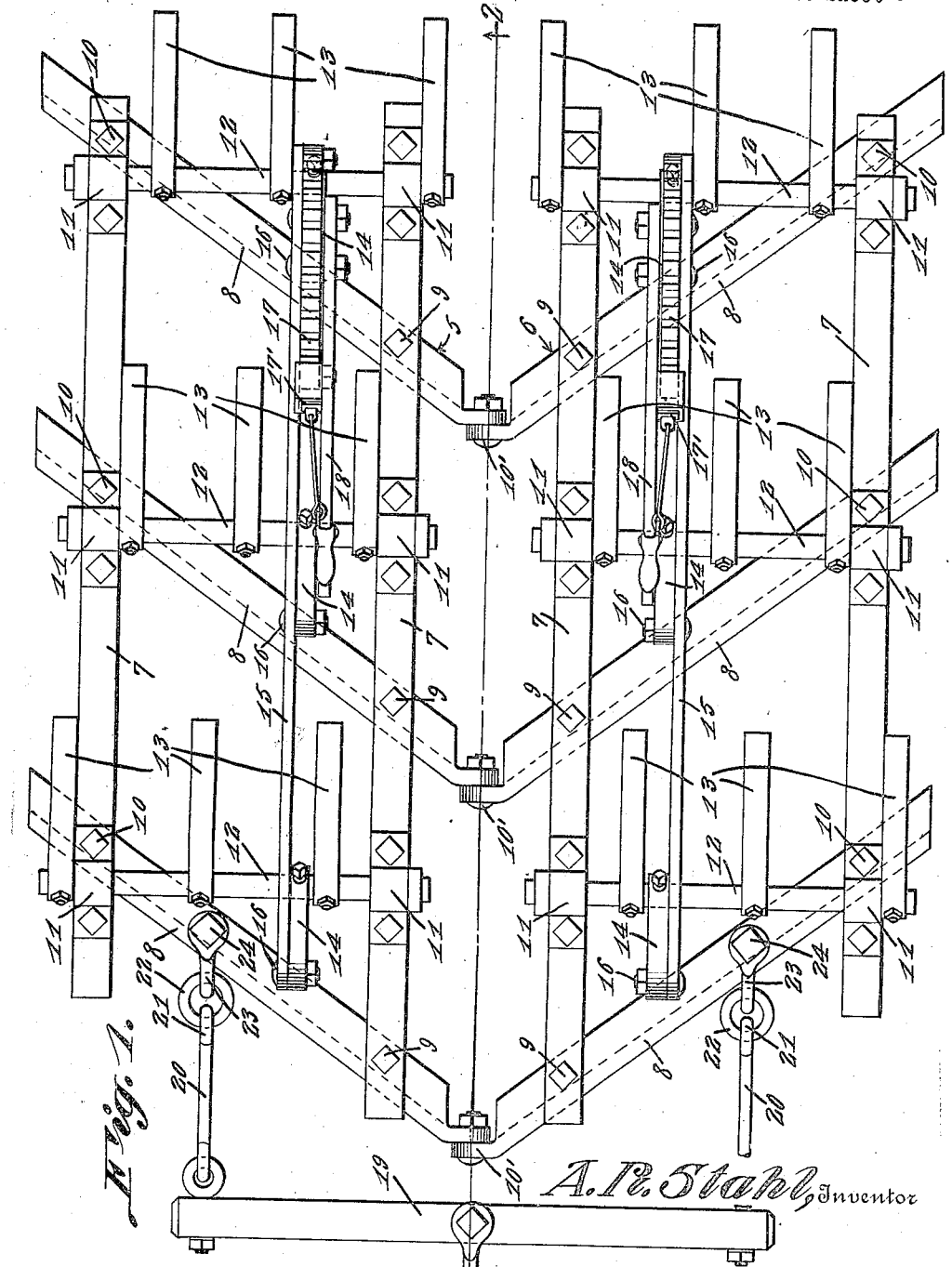

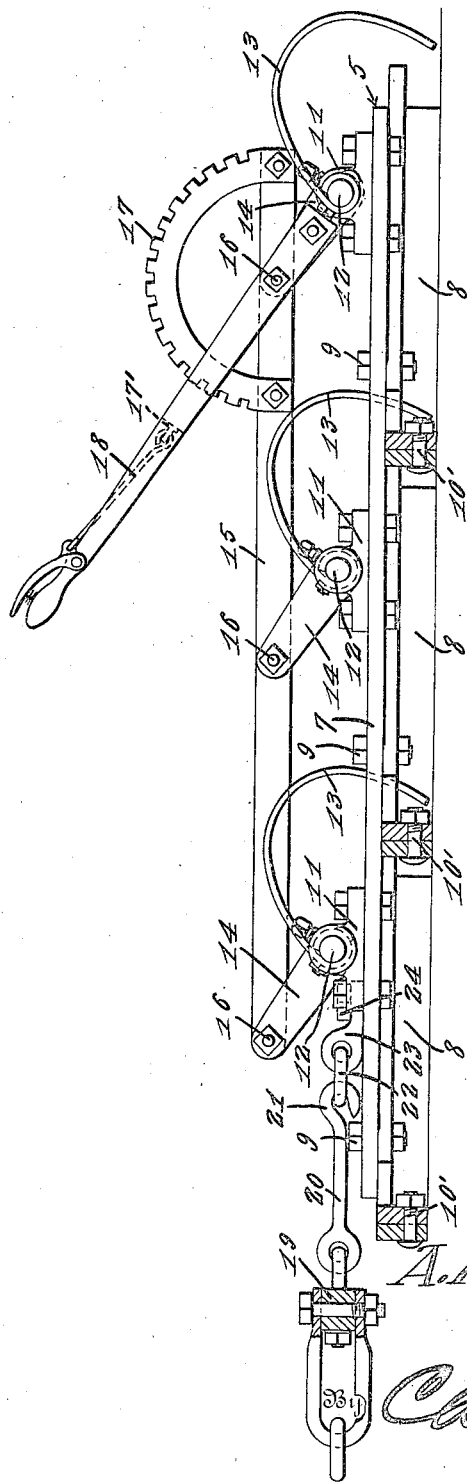

1,465,188

UNITED STATES PATENT OFFICE.

ALBERT R. STAHL, OF SOMERSET, PENNSYLVANIA.

HARROW.

Application filed December 23, 1922. Serial No. 608,648.

*To all whom it may concern:*

Be it known that I, ALBERT R. STAHL, a citizen of the United States, residing at Somerset, in the county of Somerset and State of Pennsylvania, have invented a new and useful Harrow, of which the following is a specification.

This invention has reference to harrows, and more particularly to harrows of the spring tooth type.

The primary object of the invention is to provide a combined harrow and land pulverizer, whereby the harrowing and pulverizing results may be accomplished by a single operation.

Another object of the invention is to provide a harrow of this character wherein the spring teeth may be adjusted with respect to the pulverizing bars, so that the teeth may operate at various depths.

A still further object of the invention is the provision of means, whereby the harrow, which embodies a pair of pivoted sections, may be folded into a small and compact article, for storing.

With the foregoing and other objects in view which will appear as the description proceeds, the invention resides in the combination and arrangement of parts and in the details of construction hereinafter described and claimed, it being understood that changes in the precise embodiment of the invention herein disclosed, may be made within the scope of what is claimed, without departing from the spirit of the invention.

Referring to the drawings:

Figure 1 is a plan view of the harrow.

Figure 2 is a sectional view taken on line 2—2 of Figure 1.

Referring to the drawings in detail, the harrow includes sections 5 and 6 respectively, each of which sections includes parallel supporting bars 7, which are held in spaced relation with each other by means of the pulverizing bars 8, which are bolted thereto as at 9.

These pulverizing bars 8 are disposed at angles with respect to the bars 7 and are arranged in spaced relation with each other, as clearly shown by Figure 1 of the drawings. As shown, the pulverizing bars embody angle irons, which have their adjacent ends pivotally connected as at 10', the ends being shown as extending at angles with respect to the vertical sections of the angle irons or pulverizing bars 8.

Bolted to the bars 7 are bearing members 11 in which the spring tooth supporting shafts 12 are mounted, the spring teeth of one shaft being disposed in staggered relation with respect to the teeth of the adjacent shaft, so that the teeth, which are indicated at 13, will contact with substantially the entire surface over which the harrow is moving.

Secured to the shafts 12 of each section, are arms 14 which extend upwardly therefrom, and which have connection with the operating bars 15 by means of the bolts 16. A rack bar indicated at 17 has connection with each bar 15 and cooperates with the sliding dog 17' carried by the controlling lever 18 to hold the bar in various positions of adjustment.

The lower end of the lever 18 has connection with the rear shaft 12 to cause the shaft 12 to rotate upon movement of the lever 18, which movement results in a relative movement of the shafts of the section, to adjust the depth of operation of the teeth 13.

A hitch is indicated at 19 and is connected to the harrow by means of the connecting links 20 which have their hooked ends 21 positioned in the rings 22 that are secured to the foremost bars 8 of the harrow by means of the members 23 which are bolted thereto as at 24.

From the foregoing it will be seen that due to the construction of the pivoted sections, one section may pivot with respect to the adjacent section to adjust itself to irregularities of a surface under cultivation. It will further be seen that in operation, the bars 8 contact with the ground surface to pulverize the same while the teeth 13 are harrowing the surface.

If it be desired to use the harrow in connection with tractors, two or more of the sections may be connected in any suitable and well known manner.

What is claimed as new is:—

1. A harrow comprising pivoted sections, each of said sections comprising supporting bars and angularly disposed pulverizing bars, pivoted tooth supporting shafts supported on the supporting bars, spring teeth on the tooth supporting shafts, and means for adjusting the shafts to cause the spring teeth to operate at various depths.

2. A harrow comprising pivoted sections, pulverizing bars disposed at angles, movable tooth supporting shafts forming a part of each section, said pulverizing bars adapted to rest on the ground surface and said teeth adapted to dig into the ground surface, and means for adjusting the teeth.

3. A harrow comprising pivoted sections, pulverizing bars forming a part of each section, said pulverizing bars adapted to rest on the ground surface, and adjustable teeth supported by each section.

4. A harrow comprising sections, each section including spaced pulverizing bars said pulverizing bars being disposed at angles and having their adjacent ends pivotally connected, and adjustable teeth carried by each section.

5. A harrow comprising sections, means for pivotally connecting the sections to permit one section to move with respect to the other section, pulverizing bars disposed in spaced relation with each other, said pulverizing bars including angle bars, and adjustable teeth carried by each section, said pulverizing bars adapted to move over the ground surface, and said teeth adapted to pierce the ground surface.

In testimony that I claim the foregoing as my own, I have hereto affixed my signature in the presence of two witnesses.

ALBERT R. STAHL.

Witnesses:
N. H. STIGMEN,
E. M. BAKER.